United States Patent [19]

Flisikowski

[11] Patent Number: 4,618,789

[45] Date of Patent: Oct. 21, 1986

[54] LINEAR MOTOR FOR THE HIGH-SPEED RECIPROCATING MOVEMENT OF A ROTOR SLIDE POSSESSING MASS

[75] Inventor: Peter Flisikowski, Hamburg, Fed. Rep. of Germany

[73] Assignee: U.S. Philips Corporation, New York, N.Y.

[21] Appl. No.: 630,474

[22] Filed: Jul. 12, 1984

[30] Foreign Application Priority Data

Jul. 21, 1983 [DE] Fed. Rep. of Germany ....... 3326238

[51] Int. Cl.⁴ .......................................... H02K 41/02
[52] U.S. Cl. .......................................... 310/13; 310/27
[58] Field of Search .................................. 310/12–14, 310/27; 318/135

[56] References Cited

U.S. PATENT DOCUMENTS 3,374,409  3/1968  Gorka ................................ 310/27 X
3,417,269 12/1968  Heller et al. ........................ 310/27
3,440,464  4/1969  Tolmie ............................... 310/27 X
3,924,146 12/1978  George ................................ 310/36

Primary Examiner—Donovan F. Duggan
Attorney, Agent, or Firm—David R. Treacy

[57] ABSTRACT

A linear motor for the high-speed reciprocating movement of a mass-possessing rotor slide component and particularly of a radiation filter, with parallel flat stator plates with permanent magnets which are fitted to the facing sides of the stator plates and set up a magnetic field across the air gap between them. Fitted to the slide is a coil which can be slid in the permanent magnetic field. The coil consists of an aluminium foil provided at its surface with an insulating layer, which foil is wound to form an air-cored coil, and the slide is supported on gas bearings which extend through the aluminium bridges between the stator plates. To avoid impacts during acceleration and braking linear motors working reciprocally are provided.

9 Claims, 3 Drawing Figures

LINEAR MOTOR FOR THE HIGH-SPEED RECIPROCATING MOVEMENT OF A ROTOR SLIDE POSSESSING MASS

The invention concerns a linear motor for the high-speed reciprocating movement of a mass-possessing rotor slide, with flat stator plates arranged parallel to each other, with permanent magnets which are fitted to the facing sides of the stator plates and set up a magnetic field across the air gap between them, and with a coil carried by the slide and slidable in the permanent magnetic field.

A linear motor of this kind is known as regards its function but with a somewhat different three-dimensional construction from German OS No. 19 04 905. The slide carrying the coil is here located on rails outside the magnetic arrangement.

A linear motor of this kind is suitable, for example, for recording, measuring or reading devices in which the functional head has relatively little mass. Additionally, the positioning-movement times of the slide are of the order of tenths of a second.

There are applications in which relatively large masses have to be positioned within a few milliseconds. The known linear motor is incapable of doing so.

One application in which a rotor slide has to be shifted from one rest position to another within a few milliseconds occurs, for example, in computerized tomography. Here, for example, filters have to be moved backward and forward within 3.5 msec in order to make radiographs at voltages constantly alternating between 120 kV and 80 kV. The radiographs in this case are taken in the form of signals from detectors and stored in a computer. To perform this function a radiation filter has to be transported into the radiation area and, after a dwell time of 3.5 msec within which the radiography is performed, slid out of the radiation area again within 3.5 msec. The cycle time of this process is thus 7 msec.

Considerable forces are necessary in order to effect the movement of the radiation filter within 3.5 msec. In particular, it is necessary to create a coil which makes an adequate flux possible but which, on the other hand, is not too heavy. These are two conflicting requirements.

The purpose of the invention is to create a linear motor for the high-speed reciprocating movement of a mass-possessing rotor-slide component whose excitation coils, which are carried by the rotor slide, make a high current flow possible for a low weight, the slide being mounted on bearings which are as free as possible from friction.

The problem set has been solved in accordance with the invention by winding a disc-shaped coil from an aluminium foil provided with an insulating layer at its surface, its axis being perpendicular to the direction of movement of the rotor slide, which slide is placed in gas bearings extending between the stator plates by means of bridges.

Aluminium has a lower specific gravity than copper. It is therefore particularly suitable for use in lightweight components. An aluminium foil having an insulating layer at its surface makes a high current flow possible with low weight. With a foil cross-section area of 10 mm×0.1 mm and 130 turns the coil can be subjected temporarily to 32 A without sustaining damage. A very essential point in this connection is that the potential difference between the individual turns is extraordinarily small.

It should be noted that a coil for a linear motor is known from the publication of the examined German application No. 20 60 448, which coil is wound in the form of a helical spring from flat anodised aluminium wire. This known helical-spring-shaped coil, however, possesses quite different properties from the disc-shaped flat coil in the linear motor according to the invention.

The air bearings reduce the friction between the slide and the stator to a minimum. In this connection it has proved advantageous if, in accordance with a further development of the invention, the gas bearing consists of a porous carbon bushing through which a gaseous medium is forced on to a component led through the sleeve.

The accelerating forces, and those to be decelerated, are quite considerable at the high displacement speeds occurring. Starting and braking can consequently lead to very considerable impacts in the motor suspension. To avoid such impacts, measures are taken in a further embodiment of the invention such that two similarly designed linear-motor parts are arranged axially one behind the other and energised reciprocally. Because of the reciprocal movements of the rotors the impacts within the motor unit as a whole are eliminated.

The invention will now be further explained with reference to the example of embodiment shown in the drawing.

Figure 1:
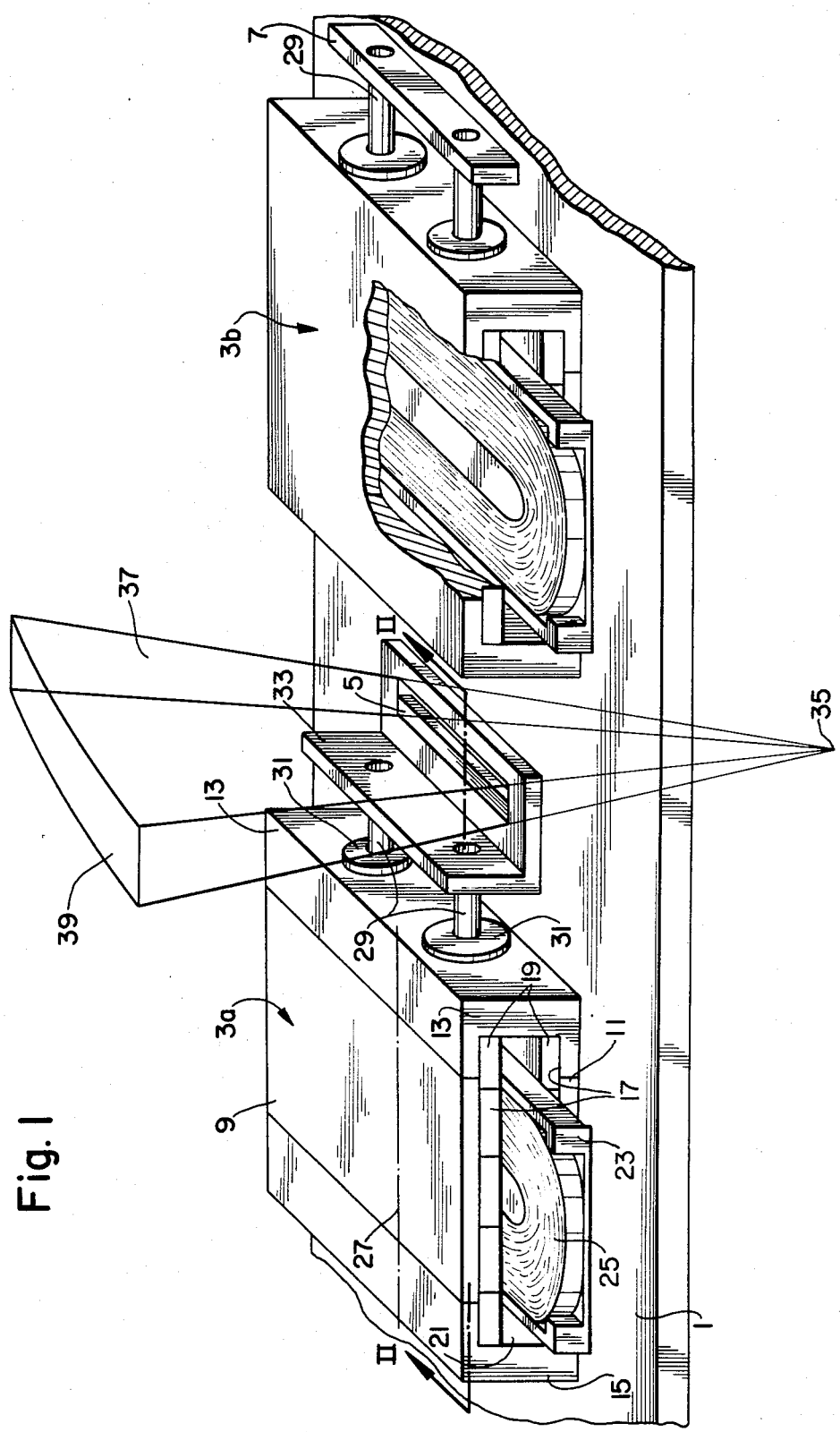
FIG. 1 shows two reciprocally working linear motors on a support, one of which displaces a radiation filter.

Two linear motors 3a and 3b are arranged one behind the other in the longitudinal direction on a support 1. Linear motor 3a is used to displace a radiation filter while linear motor 3b is used to move a counterweight 7.

Linear motor 3a has two stator plates 9 and 11 which are connected to each other at their axial ends 13 by means of aluminium bridges 15. Permanent magnetic plates 19 are fitted on the insides 17 of the stator plates. The permanent magnetic plates create in the air gap 21 between them a magnetic field 21, the form of which is further explained in FIG. 2.

A slide 23 for an air-cored coil 25 runs on bearings on which it can be slid on the direction of the center line 27 in the air gap 21. The plastic slide 23 holds the coil which is wound from an anodized aluminium foil and lies flat in the slide, with its center axis perpendicular to the direction of displacement. With the aid of guide rods 29 (see also FIG. 2) slide 23 is supported on bearings on which it can be slid in air gap 21. The rods are led through the aluminium bridges 15 and supported in them for movement with little friction by means of gas bearings 31.

Fitted to the guide rods 29, outside the motor 3a, is a mounting 33 which carries the radiation filter 5. By means of the radiation filter 5 a diverging radiation beam 37 emerging from a radiation source can be limited to a radiation cone 39.

Linear motor 3b is identical in its design to linear motor 3a, except that counterweight 7 is fitted to guide rods 29 instead of radiation filter 5. In operation the two linear motors are energized reciprocally.

Figure 2:
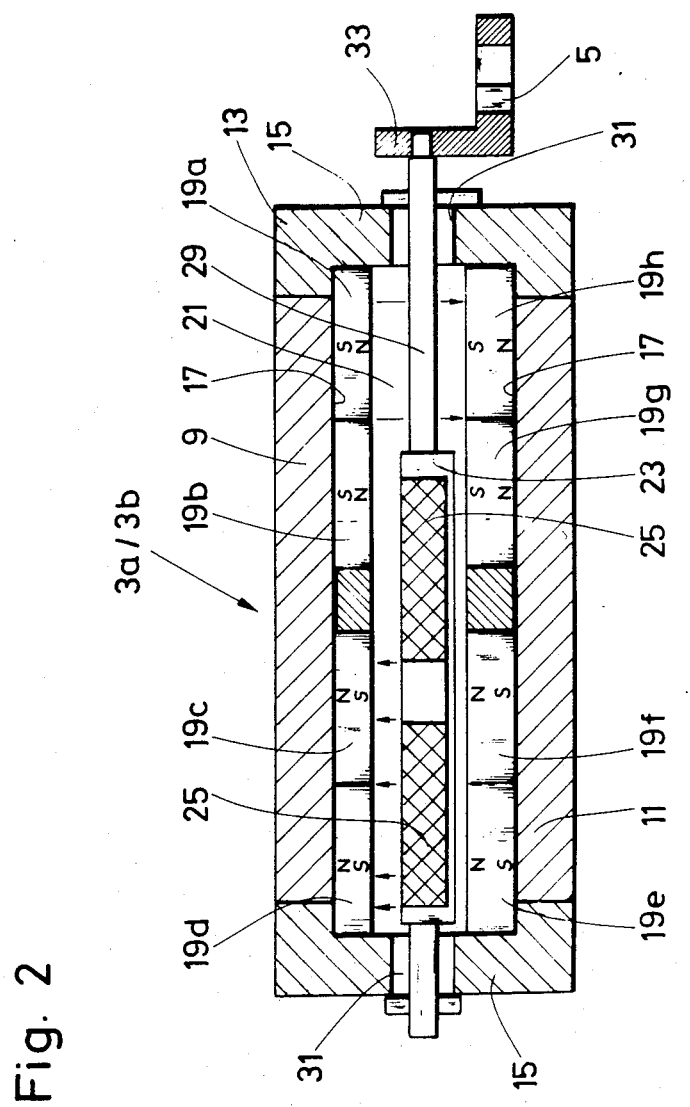
FIG. 2 shows a cross-section through the linear motor carrying the radiation filter shown in FIG. 1.

The construction of linear motors 3a and 3b in the section along lines II—II in FIG. 1 is shown in FIG. 2. The stator plates 9 and 11 are connected at their axial ends by means of aluminium bridges 15. On the inner surfaces 17 of stator plates 9 and 11, which face each other, permanent magnets 19a to 19h are fitted. These permanent magnets 19a to 19h create permanent magnetic fields in air gap 21 and in this process are diametrically magnetized in such a way that the North poles N in permanent magnets 19a and 19b and 19f are located at air gap 21. In the case of permanent magnets 19c, 19d, 19g and 19h the South poles S are located in the air gap 21. This means that the magnetic field in the air gap 21 in the lefthand part of the motor is oriented in the reverse direction to that in the right-hand part of the motor. When energized, the coil, whose axis lies in the direction of the magnetic field is slidable in the magnetic field of the air gap. The permanent magnets should preferably be sintered permanent-magnetic discs of samarium cobalt. Magnets of this kind create an extremely strong magnetic field.

Figure 3:
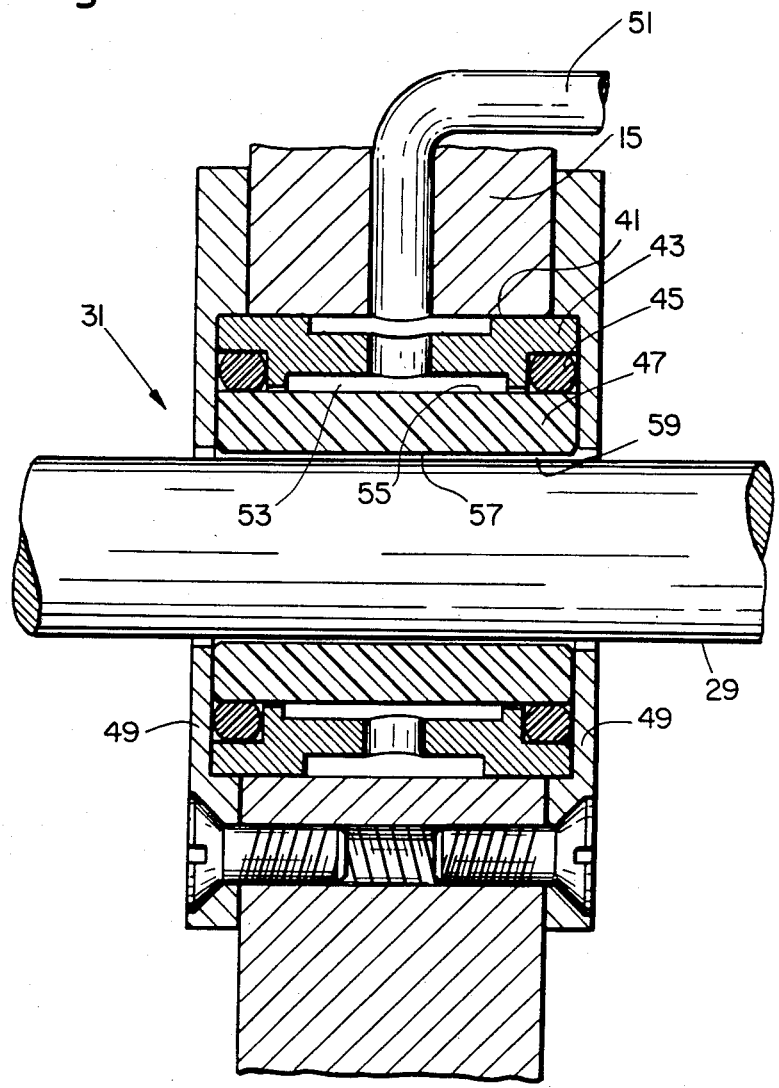
FIG. 3 shows a section through a gas bearing used to support the linear-motor slide.

Gas bearings 31 are shown in detail in FIG. 3. They are fitted in the aluminium bridges 15, each in a drilled passage 41. Fitted into this passage is a brass sleeve 43 which retains by means of O-rings 45 in it at its outer sleeve ends a bushing 47 made of porous carbon. The bearing is held together by means of screwed-on flanges 49, which press the O-rings against the gap between the brass sleeve and the carbon bush. Guide rod 29 is led through the carbon bushing 47.

Gas bearing 31 is operated with compressed air or nitrogen. Nitrogen is preferred because it is dry and cannot give off moisture. A supply pipe 51 is used to provide the carbon bushing 47 with gas at more than atmospheric pressure. This supply pipe 51 leads to an annular channel in the brass sleeve 43. This annular channel 53 encloses carbon bushing 47 at its outer wall 55. If gas is now forced into guide channel 53, the gas molecules penetrate into the carbon of the carbon bushing 47 and there is formed between the surface of the guide rod 29 and the inside wall of the carbon bushing 47 a bearing gas layer 59, in which the guide rod 29 is led free from wear.

What is claimed is:

1. A linear motor for high-speed reciprocation of a slide having a substantial mass, comprising
    first and second mutually parallel flat stator plates, each of said plates having a respective facing side facing the other plate,
    at least one flat permanent magnet disposed on one of said facing sides and defining an air gap, said magnet creating a magnetic field in said air gap, substantially perpendicular to said facing sides,
    a slide member disposed in said air gap and mounted for linear motion with respect to said stator in a given direction substantially parallel to said stator plates, and
    a coil carried on said slide member, movable by said slide member in said magnetic field,
    characterized in that said coil is spiral wound from an aluminum film having a surface insulating layer, the axis of said spiral being perpendicular to the direction of movement of the slide and parallel to the direction of the magnetic field, and
    said motor comprises first and second bridges extending between said fist and second stator plates at opposite ends of the plates in the direction of slide movement, and gas bearings formed in respective bridges, said slide being positioned transversely of the direction of movement by said gas bearings.

2. A motor as claimed in claim 1, characterized in that each of said gas bearings comprises a porous carbon bushing, a component of the slide passing through the bushing in the direction of movement, and means for forcing a gaseous medium through the porous carbon bushing.

3. A linear motor for high-speed reciprocation of a slide having a substantial mass, comprising
    first and second mutually parallel flat stator plates, each of said plates having a respective facing side facing the other plate,
    at least one flat permanent magnet disposed on one of said facing sides and defining an air gap, said magnet creating a magnetic field in said air gap, substantially perpendicular to said facing sides,
    a slide member disposed in said air gap and mounted for linear motion with respect to said stator in a given direction substantially parallel to said stator plates, and
    a coil carried on said slide member, movable by said slide member in said magnetic field,
    characterized by comprising at least two magnets disposed on said one plate, spaced from each other in the direction of motion, and oppositely poled, and
    characterized in that said coil is spiral wound from an aluminum film having a surface insulating layer, the axis of said spiral being perpendicular to the direction of movement of the slide and parallel to the direction of the magnetic field, said spiral coil being elongated in a direction transverse the direction of movement, so as to form two substantially parallel coil legs, one of said legs being disposed substantially opposite one of said magnets, and the other of said legs being disposed substantially opposite the other of said magnets, whereby current flowing through said spiral provides cumulative driving force due to the interaction with the fields of the two magnets.

4. A motor as claimed in claim 3, characterized in that said film has a width, in the direction of the coil axis, which is much greater than the film thickness.

5. A motor as claimed in claim 4, characterized in that said insulating layer is an anodized film.

6. A motor as claimed in claim 4, characterized in that said film has a width of approximately 10 mm and a thickness of approximately 0.1 mm.

7. A motor as claimed in claim 3, characterized in that
    said motor comprises first and second bridges extending between said first and second stator plates at opposite ends of the plates in the direction of slide movement, and gas bearings formed in respective bridges, said slide being positioned transversely of the direction of movement by said gas bearings, and
    each of said gas bearings comprises a porous carbon bushing, a component of the slide passing through the bushing in the direction of movement, and means for forcing a gaseous medium through the porous carbon bushing.

8. A motor assembly comprising two linear motors as claimed in claim 3, said motors being substantially identical and having their slides aligned for co-linear motion, one of said slides supporting a load to be reciprocated, and the other of said slides supporting a countermass, such that by energizing said motors for simultaneous movement in opposite directions, reaction forces on the motor assembly due to movement of the two slides cancel each other.

9. An assembly as claimed in claim 8 characterized in that each motor comprises first and second bridges extending between said first and second stator plates at opposite ends of the plates in the direction of slide movement, and gas bearings formed in respective bridges, said slide being positioned transversely of the direction of movement by said gas bearings, and each of said gas bearings comprises a porous carbon bushing, a component of the slide passing through the bushing in the direction of movement, and means for forcing a gaseous medium through the porous carbon bushing.

* * * * *